D. Quimby,
Boring Hubs.
Nº 24,756.   Patented July 12, 1859.
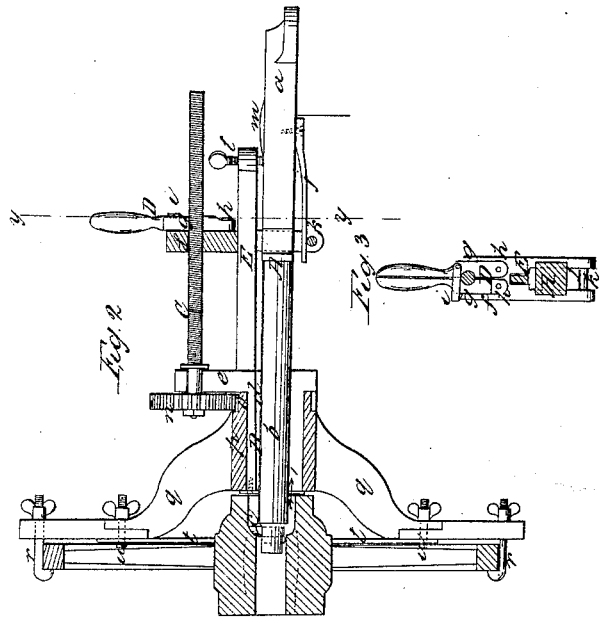
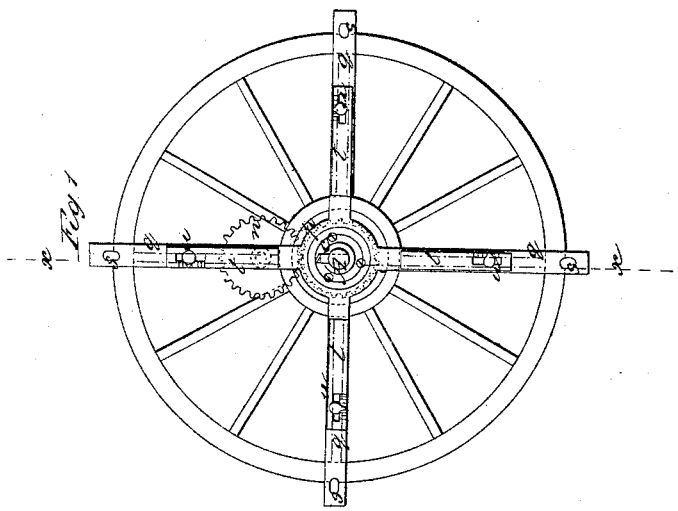
Witnesses
A. H. Quimby
William J. Bellows
Inventor
Daniel Quimby

UNITED STATES PATENT OFFICE.

DANIEL QUIMBY, OF LITTLETON, NEW HAMPSHIRE.

MACHINE FOR BORING HUBS.

Specification of Letters Patent No. 24,756, dated July 12, 1859.

*To all whom it may concern:*

Be it known that I, DANIEL QUIMBY, of Littleton, in the county of Grafton and State of New Hampshire, have invented a new and Improved Machine for Boring Hubs; and I do hereby declare that the following is a full, clear, and exact description of the same, reference being had to the annexed drawings, making a part of this specification, in which—

Figure 1, is a front view of my invention. Fig. 2, a side sectional view of ditto, *x*, *x*, Fig. 1, indicating the plane of section. Fig. 3, a transverse section of ditto, taken in the line *y*, *y*, Fig. 2, and looking in the direction of the arrow.

Similar letters of reference indicate corresponding parts in the several figures.

This invention consists in the employment or use of an adjustable rotating clamp, stationary cutter and feed screw, combined and arranged substantially as hereinafter fully described, whereby hubs may be bored in taper form to receive their boxes, and the machine rendered capable of being adjusted to bore hubs of varying sizes and with holes of greater or less taper form as may be desired.

To enable those skilled in the art to fully understand and construct my invention I will proceed to describe it.

A, represents a stationary shaft, one end *a*, of which is secured to any proper support or framing and has its outer part *b*, of cylindrical form as shown plainly in Fig. 2. This shaft A, is of metal and it is provided at its outer end with a cutter *c*, of gouge form.

On the cylindrical part *b*, of the shaft A, a hub or boss B, is placed and allowed to slide freely thereon. The interior or bore *d*, of this hub or boss is not of equal diameter throughout, but is of conical form, its smaller end being nearest the outer end of the shaft A, see Fig. 2. The back end of the hub or boss B, has an upright *e*, attached to it, which serves as a bearing for the front end of a screw rod C, the back end of said screw rod passing through an upright *f*, attached to shaft A. On the screw rod C, just back of the upright *f*, a nut D, is placed. This nut is formed of two parts *g*, *g*, the lower ends of which are pivoted to the upright *f*, as shown at *h*, *h*, the upper ends, when the nut embraces the screw rod being secured together by a catch *i*. The lower end of upright *f*, is allowed a certain degree of vertical play on the shaft A, and a spring *j*, which is attached to the under side of the shaft A, bears on a traverse pin *k*, in the lower end of the upright and has a tendency to keep said upright depressed to its fullest extent.

To the back end of the hub or boss B, a rectangular bar E, is attached at right angles. This bar E, passes through the upright *f*, and it has a set screw *l*, passing through its outer end, said screw bearing on the shaft A. To the upper surface of the shaft A, back of the upright *f*, a convex projection *m*, is attached, the use of which will be presently shown.

On the front end of the screw rod C, a toothed wheel *n*, is placed. This wheel *n*, mashes into a sunken gear *o*, at the back end of a collar *p*, which is placed on the boss B, and secured thereto in any proper manner. To the collar *p*, four radial curved arms *q*, are attached, each arm having a hook *r*, fitted in a slot *s*, near its outer end. And to each arm a graduated slide or gauge *t*, is attached by a bolt *u*.

The operation is as follows:—The wheel, shown in red, is secured to the arms *q*, by the hooks *r*, the hub of said wheel which is to be bored being centered accurately by means of the graduated slides or gauges *t*. The bar E, is then by adjusting the set screw *l*, set more or less obliquely with the shaft A, and the back part of the boss B, will also be more or less inclined or out of parallel with shaft A, the conical form of the bore *d*, permitting such adjustment, as also the vertical movement that is allowed the upright *f*. The wheel and arms *q*, are then turned from left to right and the screw rod C, is rotated by the gearing *n*, *o*, said screw in consequence of the nut D, feeding the hub of the wheel and boss B, along on the shaft A, in the direction of arrow 1, while the cutter or gouge *c*, cuts a hole in taper form— the taper being due to the eccentric adjustment of the boss B.

From the above description it will be seen that a greater or less degree of taper may be given the hole in the hub by adjusting the boss B, more or less obliquely with the shaft A. The convex projection *m*, causes, as the screw *l*, passes over it, the cutter or gouge *c*, to cut the hole somewhat larger in diameter at its center than at its ends. The object of this is that the ends of the spokes may be cut so short as to effectually prevent them bearing on the box which is inserted in the hub of the wheel. The red dotted lines show the form of the hole made by the cutter or gouge. When the hub is moved, the wheel and boss B, may be shoved directly back by opening the nut D.

This device has been practically tested and operates well, the work being done in a perfect manner and very expeditiously.

I do not claim boring taper holes in hubs by turning the hub eccentrically with a cutter or gouge, for this has been previously done; but, I do claim as new and desire to secure by Letters Patent, 1. The shaft A, the boss B, placed on said shaft and provided with a conical bore $d$, and having the collar $p$, and arms $q$, attached, the screw rod C, connected with the collar $p$, by the gearing $n$, $o$, and provided with the divided nut D, attached to the upright $f$, the whole being arranged to operate substantially as and for the purpose set forth.

2. I further claim in combination with the parts above named the convex projection $m$, placed on the shaft A, to operate as and for the purpose specified.

DANIEL QUIMBY.

Witnesses:
A. H. QUIMBY,
WILLIAM J. BELLOWS.